(12) United States Patent
Jakab et al.

(10) Patent No.: US 11,753,997 B2
(45) Date of Patent: Sep. 12, 2023

(54) EXHAUST BAFFLE COMPONENT FOR AN AIR TURBINE ASSEMBLY

(71) Applicant: Hamilton Sundstrand Corporation, Charlotte, NC (US)

(72) Inventors: Thomas Jakab, Lake Geneva, WI (US); Jordan Christopher Pugliese, Woodstock, IL (US); Jeffrey Todd Roberts, Winnebago, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 33 days.

(21) Appl. No.: 17/205,217

(22) Filed: Mar. 18, 2021

(65) Prior Publication Data
US 2022/0018287 A1    Jan. 20, 2022

Related U.S. Application Data (60) Provisional application No. 63/000,107, filed on Mar. 26, 2020.

(51) Int. Cl.
| | | |
|---|---|---|
| F02C 7/277 | (2006.01) | |
| F02C 7/26 | (2006.01) | |
| F01D 9/04 | (2006.01) | |
| F01D 9/02 | (2006.01) | |

(52) U.S. Cl.
CPC ............... F02C 7/277 (2013.01); F01D 9/02 (2013.01); F01D 9/045 (2013.01); F02C 7/26 (2013.01); *F05D 2240/129* (2013.01)

(58) Field of Classification Search
CPC . F02C 7/277; F01D 9/04; F01D 9/047; F01D 25/30; F05D 2240/126
See application file for complete search history.

(56) References Cited

U.S. PATENT DOCUMENTS

| | | | | |
|---|---|---|---|---|
| 1,802,329 | A | * | 4/1931 | Birmann ................. F01D 25/30 415/185 |
| 4,074,914 | A | | 2/1978 | Novotny |
| 4,391,564 | A | * | 7/1983 | Garkusha ............... F01D 25/30 415/126 |
| 5,203,674 | A | * | 4/1993 | Vinciguerra ........... F01D 25/30 415/208.1 |
| 5,813,828 | A | * | 9/1998 | Norris ..................... F01D 25/30 415/142 |
| 6,231,304 | B1 | * | 5/2001 | Andersson ............. F01D 25/30 415/211.2 |

(Continued)

FOREIGN PATENT DOCUMENTS

EP          3587746 A1    1/2020

OTHER PUBLICATIONS

Extended European Search Report for International Application No. 21164331.7 dated Jul. 23, 2021, 51 pages.

(Continued)

*Primary Examiner* — Alain Chau
(74) *Attorney, Agent, or Firm* — CANTOR COLBURN LLP (57) ABSTRACT

A baffle component for a turbine starter includes a first baffle level and a second baffle level stacked with the first baffle level. The first baffle level and the second baffle level may be arranged with a starter assembly such that airflow entering the baffle levels is directed by the first baffle level and the second baffle level to exit the starter assembly.

12 Claims, 8 Drawing Sheets

(56) References Cited

U.S. PATENT DOCUMENTS

| | | | | |
|---|---|---|---|---|
| 6,533,546 | B2* | 3/2003 | Kreitmeier | F01D 25/30 415/221 |
| 6,814,539 | B2 | 11/2004 | Farnsworth et al. | |
| 7,980,055 | B2* | 7/2011 | Lindenfeld | F01D 25/30 415/126 |
| 8,133,017 | B2* | 3/2012 | Schott | F01D 9/04 415/207 |
| 8,376,700 | B2 | 2/2013 | Le Saint | |
| 8,506,235 | B2 | 8/2013 | Norem | |
| 8,522,521 | B2 | 9/2013 | Dyer | |
| 8,757,969 | B2* | 6/2014 | Pruthi | F01D 25/30 415/207 |
| 9,217,368 | B2* | 12/2015 | Myoren | F01D 1/02 |
| 2003/0017045 | A1 | 1/2003 | Telakowski | |
| 2004/0091350 | A1* | 5/2004 | Graziosi | F04F 5/54 415/914 |
| 2010/0192594 | A1 | 8/2010 | Le Saint | |
| 2010/0239418 | A1* | 9/2010 | Schott | F02C 3/14 415/207 |
| 2012/0042659 | A1 | 2/2012 | Zawilinski et al. | |
| 2012/0063893 | A1* | 3/2012 | Pruthi | F01D 25/30 415/207 |
| 2012/0114475 | A1 | 5/2012 | Norem | |
| 2018/0298785 | A1* | 10/2018 | Kim | F01D 25/30 |
| 2019/0032562 | A1* | 1/2019 | Fiste | F02C 7/32 |
| 2020/0003072 | A1* | 1/2020 | Zawilinski | F01D 19/02 |
| 2021/0262365 | A1* | 8/2021 | Yamashita | F01D 25/30 |
| 2021/0301726 | A1 | 9/2021 | Jakab et al. | |

OTHER PUBLICATIONS

Extended European Search Report for International Application No. 21164706.0 dated Jul. 23, 2021, 8 pages.

U.S. Non-Final Office Action for U.S. Appl. No. 17/205,242, dated Jun. 8, 2022, 25 pages.

* cited by examiner

EXHAUST BAFFLE COMPONENT FOR AN AIR TURBINE ASSEMBLY

CROSS-RELATED TO RELATED APPLICATIONS

This application claims priority to U.S. Provisional Application No. 63/000,107 filed Mar. 26, 2020, the contents of which are incorporated herein by reference in its entirety.

BACKGROUND

Exemplary embodiments pertain to the art of starter assemblies for engines, such as gas turbine engines and, more particularly, to exhaust baffle components to assist in directing airflow within a starter assembly of the engine.

Many relatively large gas turbine engines, including turbofan engines, may use an air turbine starter (ATS) to initiate gas turbine engine rotation. The ATS is typically mounted on an accessory gearbox which, in turn, is mounted on the engine or airframe. Consequently, the ATS is installed in the aircraft at all times even though active operation may occur only for a minute or so at the beginning of each flight cycle, along with occasional operation during engine maintenance activities.

The ATS generally includes a turbine section coupled to an output section within a housing. The turbine section is coupled to a high pressure fluid source, such as compressed air, to drive the output section through a gear system. Thus, when the high pressure fluid source impinges upon the turbine section, the output section powers the gas turbine engine. The ATS generally includes an exhaust baffle downstream of the turbine section.

Current exhaust baffle assemblies for engine starters mount each of several individual baffles in parallel with a mounting face of an engine. Such assemblies include many components such as spacers between the individual baffles and are labor intensive to assemble. Further, due to the many components and assembly challenges, the baffle component of the starter assembly may experience cracking during use.

BRIEF DESCRIPTION

According to some embodiments, exhaust baffles assemblies for a turbine starter are provided. The baffles are configured to assist in directing airflow within a starter assembly of an engine. The baffle includes a first baffle level and a second baffle level stacked with the first baffle level. The baffle levels are arranged with a starter assembly such that airflow entering the baffle levels is directed by the first baffle level and the second baffle level to exit the starter assembly.

In addition to one or more of the features described above, or as an alternative, in further embodiments of the baffle, the first baffle level may include a plurality of first airflow channels and the second baffle level may include a plurality of second airflow channels. In addition, each of the plurality of first airflow channels share a wall with one of the plurality of second airflow channels.

In addition to one or more of the features described above, or as an alternative, in further embodiments of the baffle, the first airflow channel of the plurality of first airflow channels is defined by a pair of fins spaced from one another and extending between the shared wall and a lower wall.

In addition to one or more of the features described above, or as an alternative, in further embodiments of the baffle, the first baffle level may include an upper outer edge and the shared wall extends from the upper outer edge.

In addition to one or more of the features described above, or as an alternative, in further embodiments of the baffle, the first baffle level and the second baffle level may define a first attachment feature at a first end and a second attachment feature at a second end. The attachment features are configured to facilitate a connection between adjacent baffle sections. The connected adjacent baffle sections define a substantially circular shape defining a first central axis.

In addition to one or more of the features described above, or as an alternative, in further embodiments of the baffle, the baffle levels may be arranged with one another such that a first airflow traveling through the first baffle level is in a direction substantially parallel with a second airflow traveling through the second baffle level.

In addition to one or more of the features described above, or as an alternative, in further embodiments of the baffle, the shared wall may be oriented at an angle substantially between zero and ninety degrees relative to the first central axis defined by the substantially circular shape.

In addition to one or more of the features described above, or as an alternative, in further embodiments of the baffle, the baffle levels may be arranged with one another such that airflow from the starter assembly is exhausted via two airflow channels.

In addition to one or more of the features described above, or as an alternative, in further embodiments of the baffle, the first baffle level and the second baffle level may be formed via additive manufacturing.

In addition to one or more of the features described above, or as an alternative, in further embodiments of the baffle, the first baffle level may include a plurality of first airflow channels and the second baffle level may include a plurality of second airflow channels. In addition, each first airflow channel of the plurality of first airflow channels defines an airflow central plane and each second airflow channel of the plurality of second airflow channels is oriented substantially parallel to the airflow central plane.

According to some embodiments, starter assemblies for turbines are provided. The starter assembly includes a baffle component. The baffle component includes a plurality of first airflow channels. The first airflow channels are defined by a pair of fins spaced from one another, a lower wall, and a shared wall. In addition, the baffle component includes a plurality of second airflow channels. The second airflow channels are defined by one of the pairs of fins and the shared wall. Further, each of the pairs of fins extend through the shared wall such that each of the pairs of fins partially define one of the plurality of first airflow channels and one of the plurality of second airflow channels.

In addition to one or more of the features described above, or as an alternative, in further embodiments of the starter assembly, the plurality of second airflow channels may be arranged in a stack with the plurality of first airflow channels such that the shared wall partially defines each airflow channel of the plurality of first airflow channels and partially defines each airflow channel of the plurality of second airflow channels.

In addition to one or more of the features described above, or as an alternative, in further embodiments of the starter assembly, the baffle component may be arranged to define a central axis and the baffle component further has one or more posts, each post of the one or more posts extending through the baffle levels and being disposed equidistant from the central axis.

In addition to one or more of the features described above, or as an alternative, in further embodiments of the starter assembly, the baffle component may include a plurality of components. Each of the plurality of components includes a first end for securing to a first adjacent component and a second end for securing to a second adjacent component.

In addition to one or more of the features described above, or as an alternative, in further embodiments of the starter assembly, the plurality of components may be arranged with one another to define a substantially circular shape about a baffle central axis.

In addition to one or more of the features described above, or as an alternative, in further embodiments of the starter assembly, the plurality of components may be arranged such that the baffle central axis is oriented substantially perpendicular to an axis of an adjacent engine.

In addition to one or more of the features described above, or as an alternative, in further embodiments of the starter assembly, the baffle component may include more than one baffle section. Each of the more than one baffle sections are arranged with one another to define a central axis and the shared wall is oriented at an angle substantially between zero and ninety degrees relative to the central axis.

In addition to one or more of the features described above, or as an alternative, in further embodiments of the starter assembly, each airflow channel of the plurality of first airflow channels may influence a first airflow therethrough in a direction substantially parallel to an airflow direction of a second airflow traveling through each airflow channel of the plurality of second airflow channels.

In addition to one or more of the features described above, or as an alternative, in further embodiments of the starter assembly, the baffle component may be formed via additive manufacturing.

In addition to one or more of the features described above, or as an alternative, in further embodiments of the starter assembly, each first airflow channel of the plurality of first airflow channels may define an airflow central plane and each second airflow channel of the plurality of second airflow channels is oriented substantially parallel to the airflow central plane.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
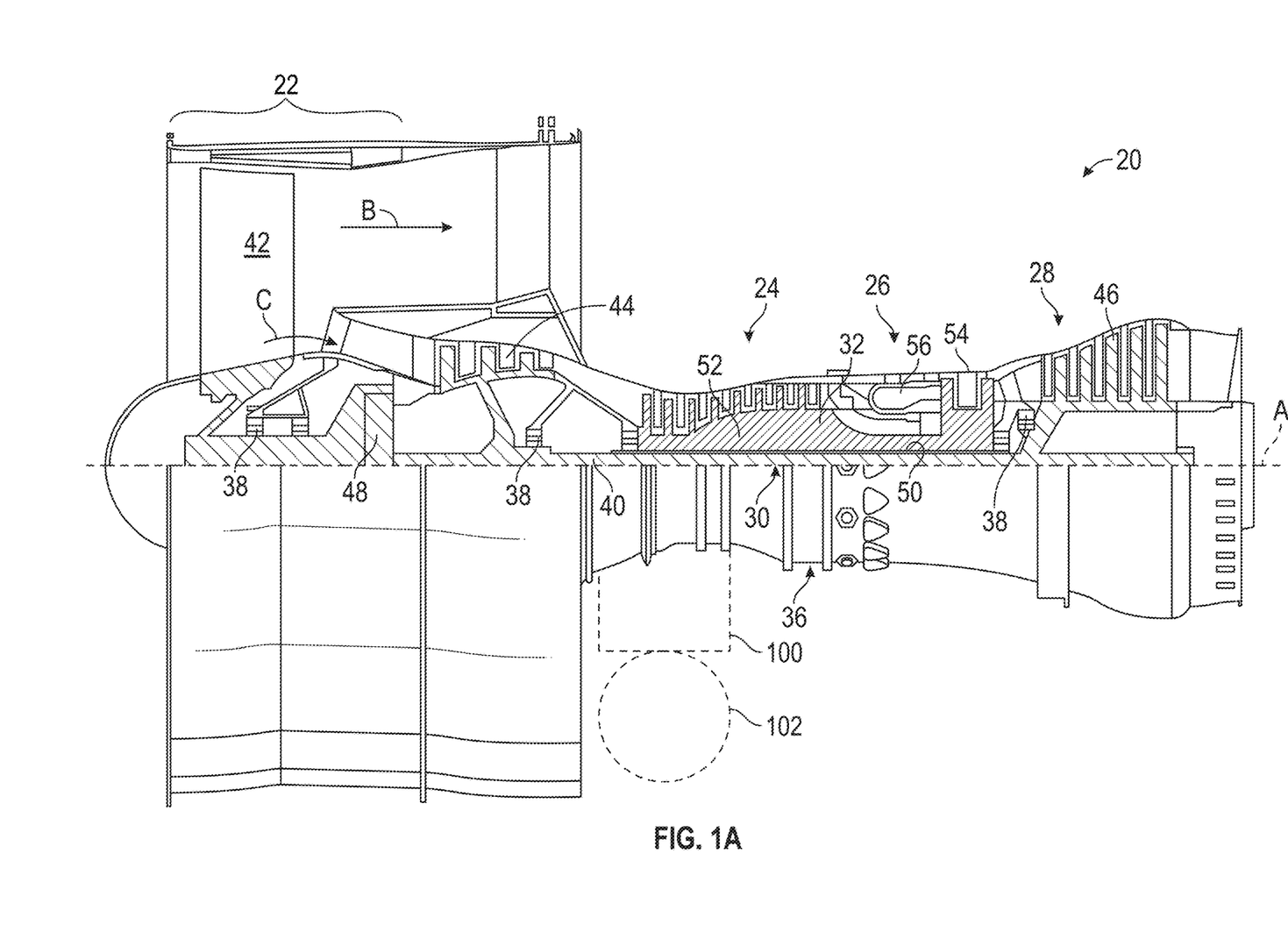
FIG. 1A is a side view, in partial cross-section, of an example of a gas turbine engine including a gear box and a starter assembly.

FIG. 1A schematically illustrates an example of a gas turbine engine 20. The gas turbine engine 20 includes a fan section 22, a compressor section 24, a combustor section 26, and a turbine section 28. Each of the fan section 22, the compressor section 24, the combustor section 26, and the turbine section 28 is arranged with one another to define an engine central longitudinal axis A In some cases, a gear box 100 may be mounted to a housing of the gas turbine engine 20 at a location adjacent one of the compressor section 24, the combustor section 26, or the turbine section 28 to facilitate mechanical communication between the engine and the gearbox.

Figure 1B:
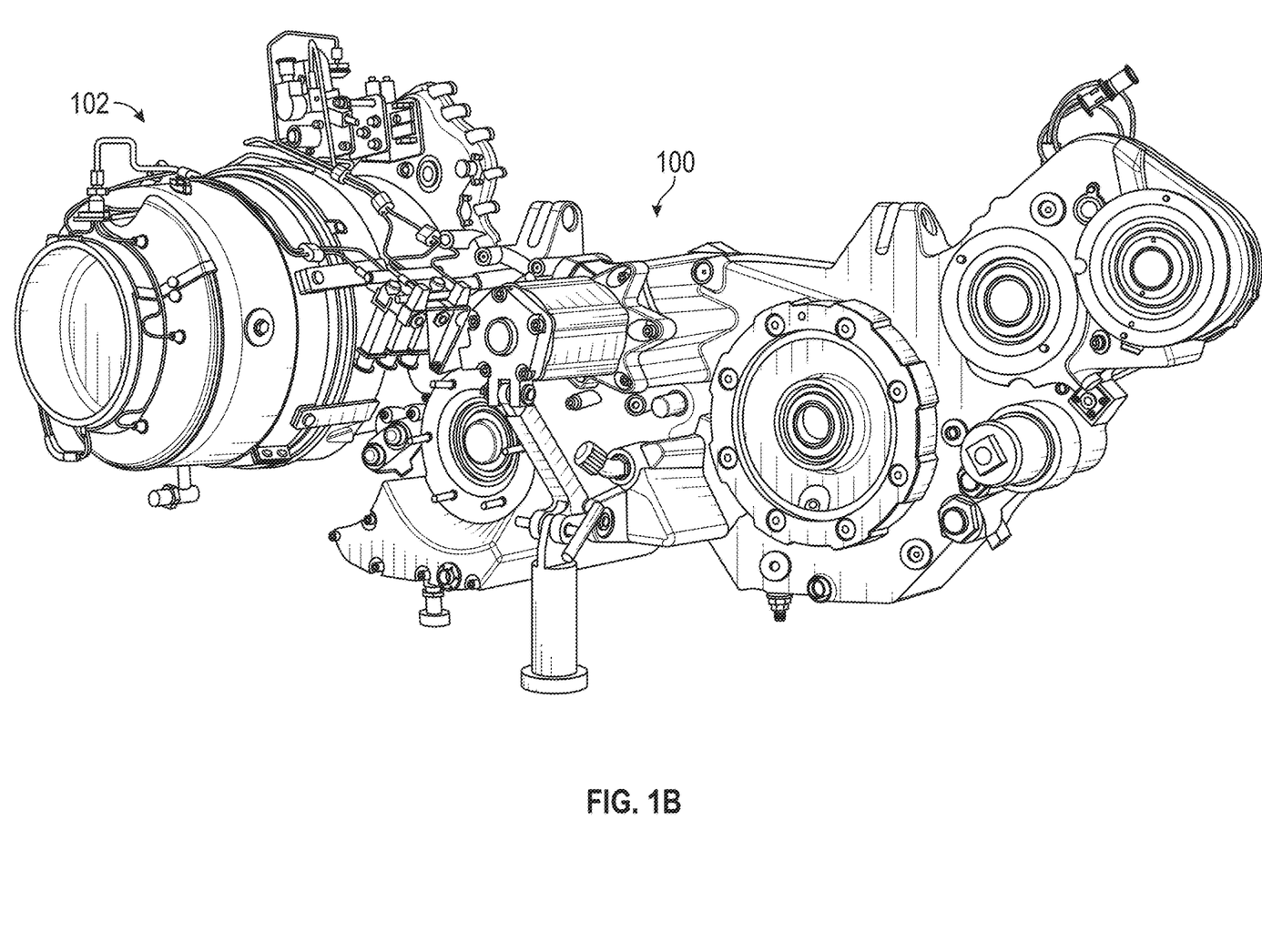
FIG. 1B is a perspective view of a starter assembly connected to a gear box.

FIG. 1B is a perspective view showing the gear box 100 connected to a starter assembly 102 of FIG. 1A. In one example, the starter assembly 102 may be an air turbine starter. Components of the gear box 100 may be arranged with components of the gas turbine engine 20 to transfer mechanical energy between the gas turbine engine 20 and the starter assembly 102 in either direction. While the starter assembly 102 is shown in communication with the gas turbine engine 20 in FIG. 1A, those in the art will appreciate that the starter assembly 102 may operate with other types of engines without departing from a scope of the present disclosure.

Figure 2A:
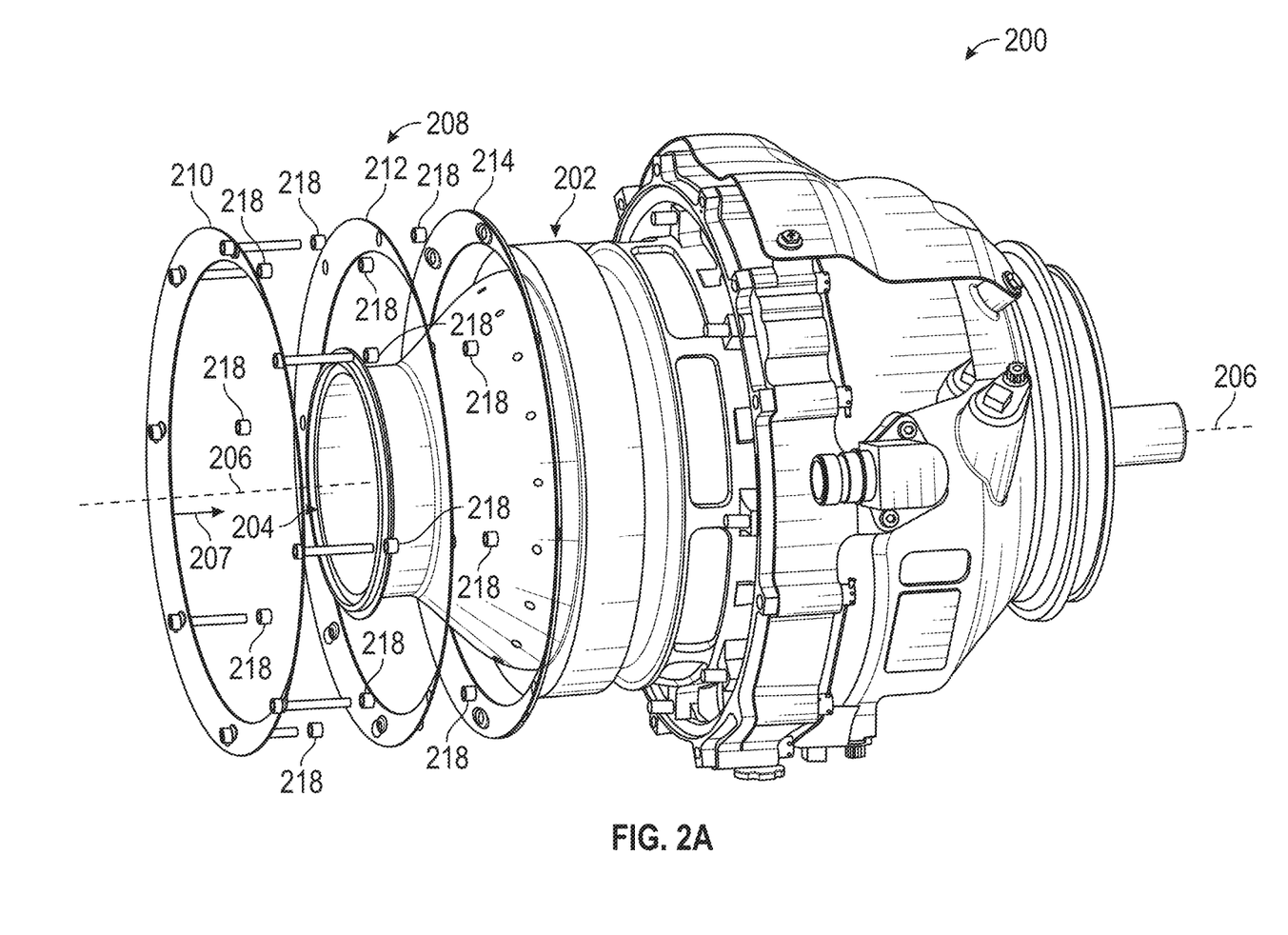
FIG. 2A is a perspective, partially exploded view of an example of a portion of a starter assembly of an engine.
Figure 2B:
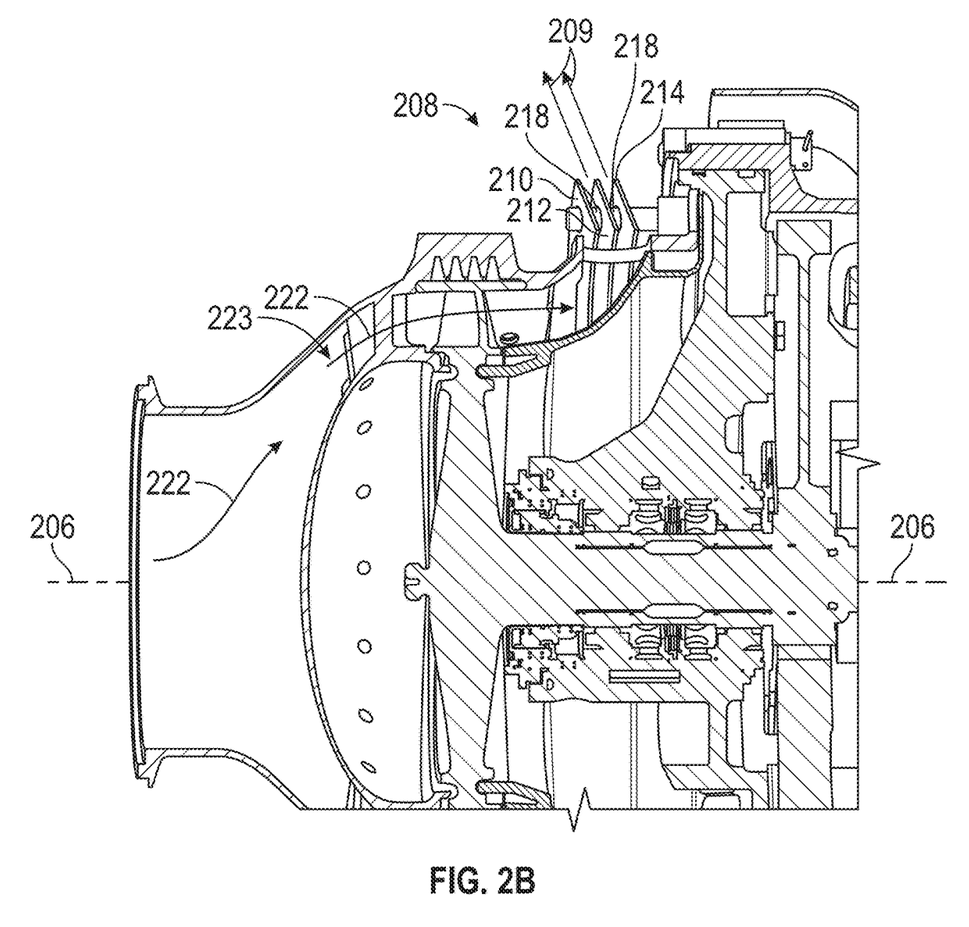
FIG. 2B is a side view, in cross-section, of a portion of the starter assembly of FIG. 2A.

FIGS. 2A and 2B show an example of a starter assembly of a gas turbine engine, referred to generally as a starter assembly 200 herein. In one example, the starter assembly 200 may be an air turbine starter. A housing 202 defines an opening 204. The opening 204 defines a central axis 206. Air enters the housing 202 via the opening 204 in a direction substantially parallel to the central axis 206 as represented by arrow 207 in FIG. 2A. Air exiting the housing 202 is represented by arrows 209 in FIG. 2B and exits through spacing between baffle louvers described below. Arrows 209 are also generally shown in FIG. 2a for context. The starter assembly 200 includes multiple additional components. For example, the starter assembly can include an exhaust baffle assembly 208. The exhaust baffle assembly 208 includes separately formed components such as a first baffle louver 210, a second baffle louver 212, a third baffle louver 214, and a plurality of spacers 218. Each of these separately formed components must then be assembled with one another, a burdensome task. While the exhaust baffle assembly 208 is shown with three baffle louvers in FIGS. 2A and 2B, those skilled in the art will appreciate that the exhaust baffle assembly 208 may include more than three baffle louvers.

FIG. 2B shows further detail related to an assembled version of the separately formed components discussed above. The assembly process alternately stacks the baffle louvers and the spacers 218. When assembled, the baffle louvers are oriented with one another in an overlap-fashion relative to airflow originating near the central axis 206 and traveling toward the baffle assembly 208 as represented by arrows 222 in FIG. 2B. For example, air may travel from the opening 204 to the baffle assembly 208 via a channel 223. When the air reaches the baffle assembly 208, the overlap-fashion of the baffle louvers interferes with continuous exhaust airflow through the baffle assembly 208 as all or most of the exhaust airflow contacts one of the first baffle louver 210, the second baffle louver 212, or the third baffle louver 214.

Figure 3A:
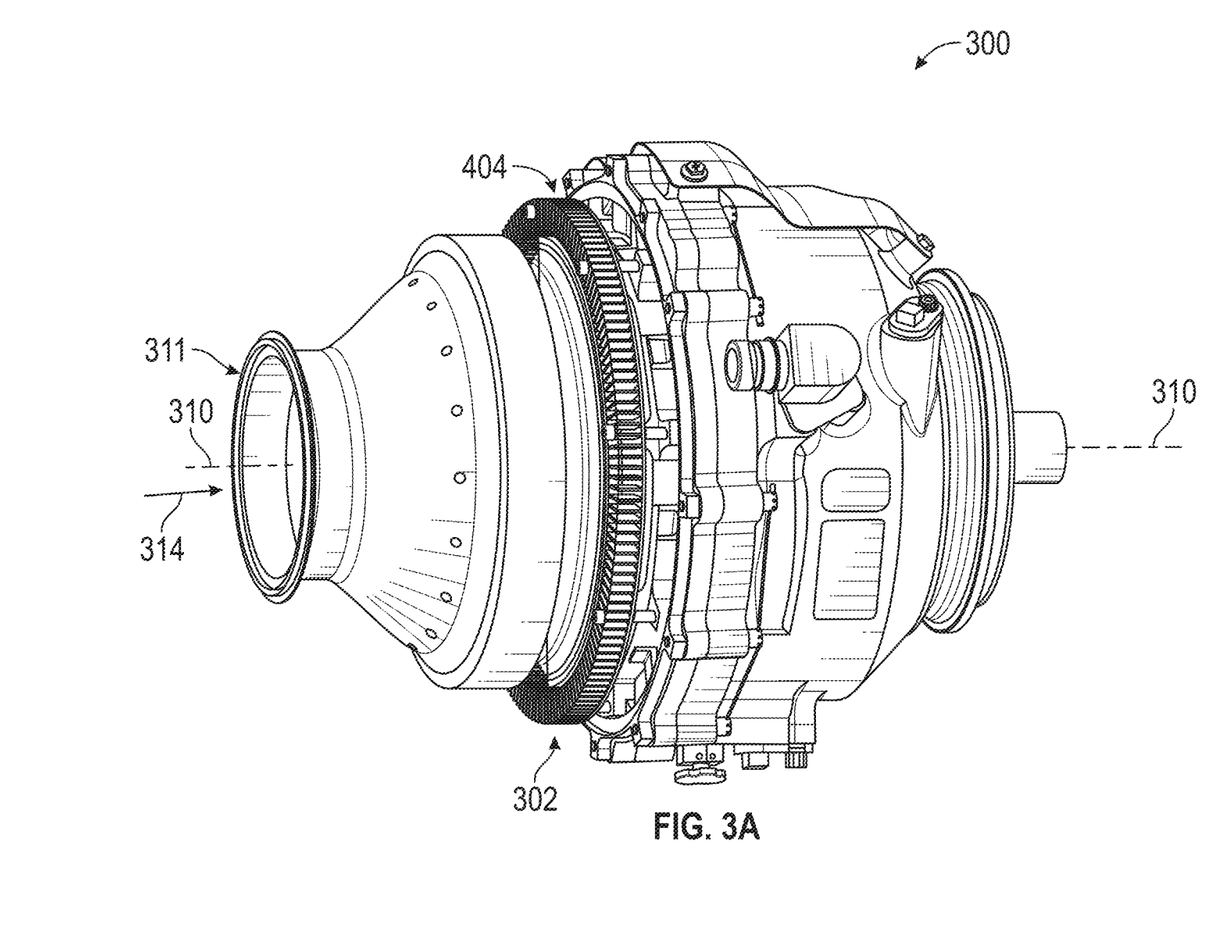
FIG. 3A is a perspective view of an example of a portion of a starter assembly of an engine.
Figure 3B:
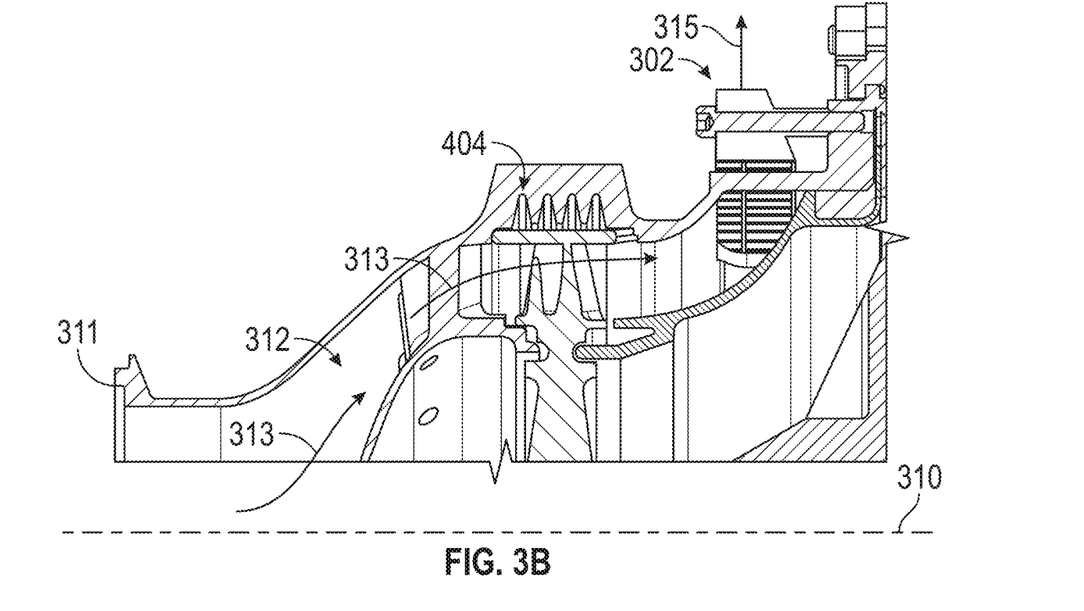
FIG. 3B is a side view, in cross-section, of a portion of the starter assembly of FIG. 3A.

FIGS. 3A and 3B illustrate an example of an engine starter assembly according to the present disclosure, referred to generally as an engine starter assembly 300 herein, and a portion of a baffle component for the engine starter assembly 300, referred to generally as a baffle component 302 herein. The engine starter assembly 300 and the baffle component 302 may be utilized in aircraft starters or other similar starters. For example, the starter assembly 300 may be coupled to a gear box in mechanical communication with an engine. The engine starter assembly 300 may be mounted adjacent to a portion of the engine, such as the gear box 100 described above in relation to the gas turbine engine 20.

The baffle component 302 may include a plurality of sections 404 connected to one another or formed as a single component. Each section 404 of the plurality of sections 404 may be spaced equidistant from a starter assembly central axis 310. In one example, each section 404 of the plurality of sections 404 may be arranged with one another to define a substantially circular shape about the starter assembly central axis 310. In another example, the starter assembly central axis 310 may be defined by an opening 311.

The baffle component 302 may be arranged with components of the engine starter assembly 300 to assist in managing airflow direction therein. Air may travel from the opening 311 to the baffle component 302 via an air channel 312 as represented with arrows 313 in FIG. 3B. Air may enter the starter assembly 300 at a location adjacent the starter assembly central axis 310 and travel in a direction parallel therewith as represented by arrow 314. Air may exit the starter assembly 300 via the baffle component 302 as represented by arrow 315 of FIG. 3B.

Figure 4A:
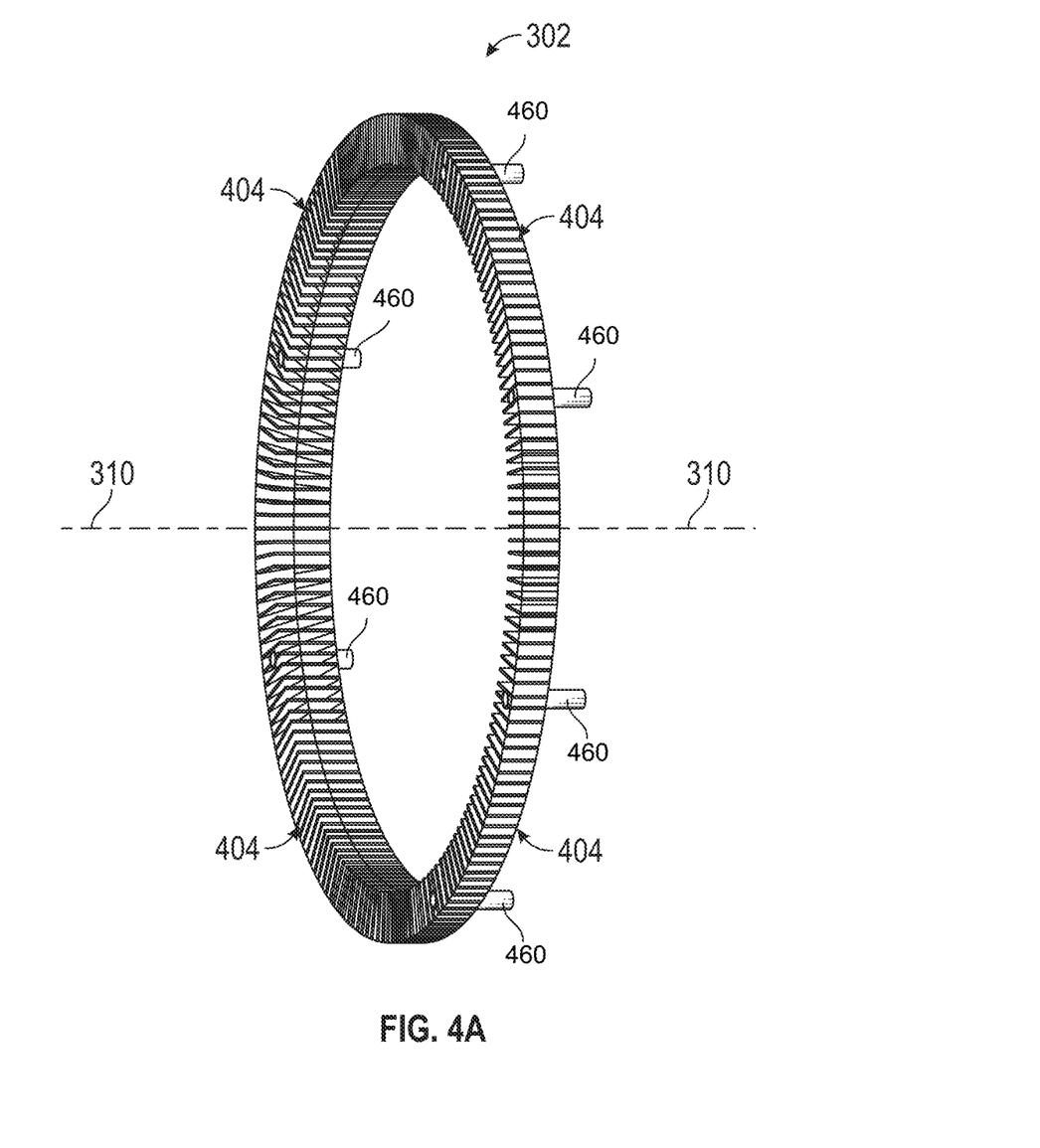
FIG. 4A is a perspective view of an exhaust baffle component of the starter assembly of FIG. 3A.
Figure 4B:
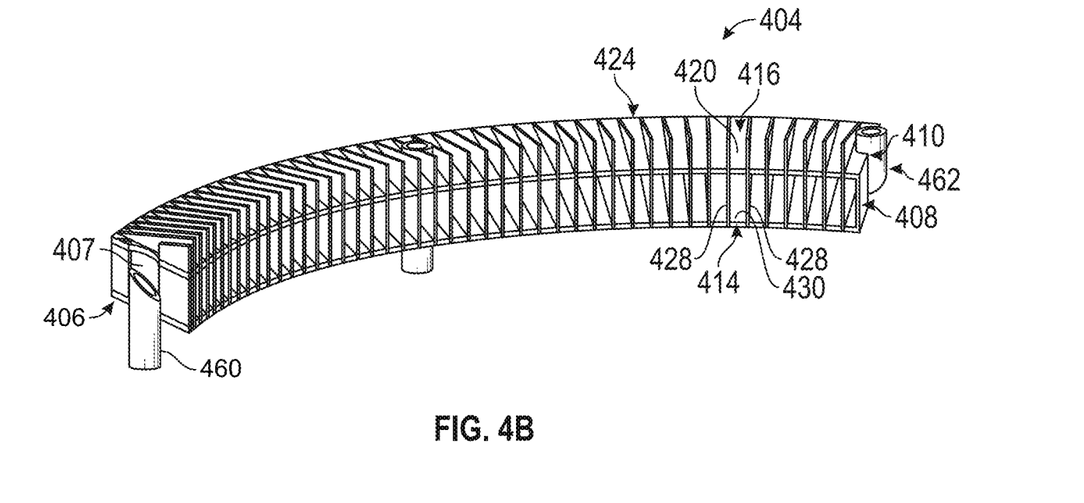
FIG. 4B is a perspective view of a portion of the exhaust baffle component of FIG. 4A.

Now additionally referring to FIGS. 4A and 4B, the baffle component 302 may include a plurality of baffle sections 404 secured to one another or formed as a single unit. Each of the baffle sections 404 may be arranged with one another to define a substantially circular shape about the central axis 310. While FIG. 4A shows a plurality of baffle sections 404, those skilled in the art will appreciate that there may be more or fewer baffle sections 404 of varying shapes based on available packaging space and desired performance metrics without departing from a scope of the present disclosure.

The baffle component 302 may include one or more posts 406 to secure the baffle component 302 to a supporting structure, such as a starter assembly. While shown as having a cylindrical shape in FIGS. 4A and 4B, those skilled in the art will appreciate that each of the one or more posts 406 may have a different shape without departing from a scope of the present disclosure. The baffle component 302 may define one or more post openings 407 to receive one of the one or more posts 406 or the one or more posts 406 may be formed with the rest of the baffle component 302 as a single unit. In one example, the baffle component 302 may be formed via additive manufacturing, for example layer-by-layer additive manufacturing. Layer-by-layer additive manufacturing involves forming successive layers on top of one another to form an object. In another example, the baffle component 302 may be formed via a stamping process.

FIG. 4B is a perspective view of one of the baffle sections 404 illustrating additional detail. Each of the baffle sections 404 may have multiple baffle levels including a first baffle level 408 stacked with a second baffle level 410. The first baffle level 408 may include a plurality of first airflow channels 414 and the second baffle level 410 may include a plurality of second airflow channels 416.

Each airflow channel of the plurality of first airflow channels 414 and the plurality of second airflow channels 416 may be defined by walls. In one example, each airflow channel of the plurality of first airflow channels 414 is partially defined by a shared wall 420. The shared wall 420 may define a portion of each of the plurality of first airflow channels 414 and each of the plurality of second airflow channels 416. The shared wall 420 may extend from an upper outer edge 424 of the baffle component 302.

Fins 428 may be spaced from one another along the baffle component 302 to further define the airflow channels. A lower wall 430 may extend about the central axis 310 and further define each airflow channel 414 of the plurality of first airflow channels 414. For example, a portion of the shared wall 420, a portion of the lower wall 430, and respective adjacent fins 428 may be arranged with one another to define one of the plurality of first airflow channels 414. In one example, each of the fins 428 may extend from the lower wall 430 to the shared wall 420. Each of the fins 428 may define a portion of both of one of the plurality of first airflow channels 414 and one of the plurality of second airflow channels 416. In another example, fins 428 may be curved in the direction of continuous exhaust airflow through baffle assembly 208 to avoid a sharp airflow turn.

The first baffle level 408 and the second baffle level 410 may separately or together define a first attachment feature at a first end 460 and a second attachment feature at a second end 462. Each of the attachment features may be configured to facilitate connection between adjacent baffle levels and adjacent baffle sections 404 as shown in FIG. 4A.

Figure 4C:
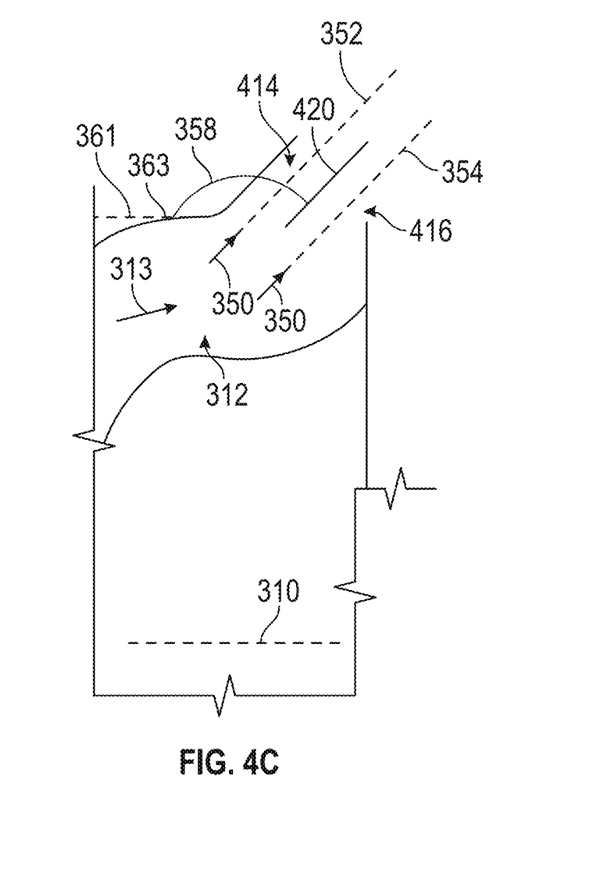
FIG. 4C is a side view, in cross-section, of a portion of the starter assembly of FIG. 3A illustrating an example of airflow influenced by the exhaust baffle component of FIG. 4A.

FIG. 4C illustrates a side view, in cross-section, of a portion of the engine starter assembly 300 including the baffle component 302 of FIG. 4A, showing an example of fluid flow within the engine starter assembly 300. Airflow traveling from the opening 311 to the baffle component 302 via the air channel 312 is represented by arrow 313. Air exiting the engine starter assembly 300 via one of the plurality of first airflow channels 414 and/or one of the plurality of second airflow channels 416 is represented by arrows 350. In one example, the airflow represented by each arrow 350 of arrows 350 may travel in a direction substantially parallel to one another along a first channel axis 352 and a second channel axis 354, respectively. In this example, a shared wall 320 may be oriented at an angle 358 having a value substantially between zero and ninety degrees. The angle 358 may be further defined by the first channel axis 352 and a face axis 361 defined by a face 363.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A baffle for a turbine starter assembly comprising:
a plurality of baffle components joined together to define the baffle and a central axis, each baffle component comprising:
a first baffle level; and
a second baffle level stacked with the first baffle level and separated from the first baffle level by a shared wall;
wherein the first baffle level and the second baffle level each have a first end and a second end and a first attachment feature is defined at the first end, wherein the first attachment feature of the first end of the first baffle level extends in a direction of the central axis;
wherein the first baffle level includes a plurality of first airflow channels defined by fins arranged between the first end and the second end and that extend from the shared wall into the first baffle level, and the second baffle level includes a plurality of second airflow channels defined by fins arranged between the first end and the second end and that extend from the shared wall into the second baffle level.

2. The baffle of claim 1, wherein the fins of each first airflow channel extend between the shared wall and a lower wall.

3. The baffle of claim 1, wherein the first and second baffle levels are arranged with one another such that a first airflow traveling through the first baffle level is in a direction substantially parallel with a second airflow traveling through the second baffle level.

4. The baffle of claim 1, wherein the shared wall is oriented at an angle substantially between zero and ninety degrees relative to the first central axis defined by the substantially circular shape.

5. The baffle of claim 1, wherein the first and second baffle levels are further arranged with one another such that airflow from the starter assembly is exhausted via two airflow channels.

6. The baffle of claim 1, wherein each of the first baffle level and the second baffle level is formed via additive manufacturing.

7. The baffle of claim 1, wherein each first airflow channel of the plurality of first airflow channels defines an airflow central plane, and wherein each second airflow channel of the plurality of second airflow channels is oriented substantially parallel to the airflow central plane.

8. A starter assembly comprising:
a starter; and
the baffle as defined in claim 1 arranged on the starter to direct air out of the starter.

9. The assembly of claim 8, wherein the baffle defines a substantially circular shape about the central axis.

10. The assembly of claim 8, wherein the shared wall is oriented at an angle substantially between zero and ninety degrees relative to the central axis.

11. The assembly of claim 8, wherein each airflow channel of the plurality of first airflow channels influences a first airflow therethrough in a direction substantially parallel to an airflow direction of a second airflow traveling through each airflow channel of the plurality of second airflow channels.

12. The assembly of claim 8, wherein the baffle component is formed via additive manufacturing.

* * * * *